US010455840B2

United States Patent
Robertson

(10) Patent No.: US 10,455,840 B2
(45) Date of Patent: Oct. 29, 2019

(54) SYSTEMS AND METHODS FOR RETARDER-TO-OVEN DOUGH PRODUCT

(71) Applicant: ARYZTA LLC, Los Angeles, CA (US)

(72) Inventor: Derek Robertson, West Dundee, IL (US)

(73) Assignee: Aryzta LLC, Los Angeles, CA (US)

(*) Notice: Subject to any disclaimer, the term of this patent is extended or adjusted under 35 U.S.C. 154(b) by 71 days.

(21) Appl. No.: 15/053,948

(22) Filed: Feb. 25, 2016

(65) Prior Publication Data

US 2016/0242423 A1 Aug. 25, 2016

Related U.S. Application Data

(60) Provisional application No. 62/120,773, filed on Feb. 25, 2015.

(51) Int. Cl.
*A21D 10/02* (2006.01)
*A21D 6/00* (2006.01)
(Continued)

(52) U.S. Cl.
CPC .......... *A21D 10/025* (2013.01); *A21D 2/165* (2013.01); *A21D 6/001* (2013.01); *A21D 8/02* (2013.01); *A21D 8/04* (2013.01)

(58) Field of Classification Search
CPC ...... A21D 10/025; A21D 2/165; A21D 6/001; A21D 8/02; A21D 8/04
See application file for complete search history.

(56) References Cited

U.S. PATENT DOCUMENTS

| 2004/0202763 A1 | 10/2004 | Cooper |
| 2010/0203193 A1 | 8/2010 | Zhang et al. |
| 2011/0033574 A1* | 2/2011 | Bonjean ............... A21D 8/047 426/19 |

FOREIGN PATENT DOCUMENTS

WO  2013092335  6/2013

OTHER PUBLICATIONS

"Retarding Loaves" The Baker's Guide.com. https://web.archive.org/web/20130630232920/https://thebakersguide.com/retarding-loaves (Year: 2011).*

(Continued)

*Primary Examiner* — Katherine D Leblanc
(74) *Attorney, Agent, or Firm* — Sheppard, Mullin, Richter & Hampton LLP

(57) ABSTRACT

A bread product and method of manufacturing the artisan bread product that eliminates or reduces the need to proof dough after thawing is discussed. One example method comprises mixing ingredients to create a dough, bulk fermenting the dough to create a non-uniform cell structure and to eliminate or reduce proofing after receipt by a restaurant, sheeting the dough, a sheeter being adjusted to allow dough sheeting while substantially maintaining the cell structure, portioning the sheeted dough into portions according to desired sizes while substantially maintaining the cell structure, freezing the portions to create frozen portions, and packaging and shipping the frozen portions while substantially maintaining the cell structure, the bulk fermenting of the dough prior to the sheeting thereby enabling, at least in part, a restaurant to receive the frozen portions, to retard thawed portions of dough, and to bake the portions of dough after retarding without proofing.

13 Claims, 3 Drawing Sheets

(51) Int. Cl.
*A21D 2/16* (2006.01)
*A21D 8/04* (2006.01)
*A21D 8/02* (2006.01)

(56) References Cited

OTHER PUBLICATIONS

International Application No. PCT/US2016/019651, International Search Report and Written Opinion dated Jun. 10, 2016.

\* cited by examiner

SYSTEMS AND METHODS FOR RETARDER-TO-OVEN DOUGH PRODUCT

CROSS REFERENCE TO RELATED APPLICATION

This application claims priority to U.S. provisional application Ser. No. 62/120,773, entitled "System and Methods for Retarder-To-Oven Dough Product," filed Feb. 25, 2015, which is incorporated by reference herein.

BACKGROUND

Bread is a common staple and is found both as a stand-alone food as well as an ingredient in many dishes. Many restaurants use considerable quantities of quality breads every day. Many restaurants lack the time, manpower, and expertise to make their own bread to meet their daily needs. Mass baking and distribution of bread, however, raises complex logistical challenges. For example, bread is generally prepared (e.g., ingredients combined) and baked or (par-baked) in bulk. Different bread types must be prepared in different ways using different recipes. Sufficient quantiles of bread are shipped to restaurants to support their customers. Quantity of shipped bread must be sufficient to meet demand but avoid degradation of quality of the bread either through deformation or staleness. Unfortunately, staff at restaurants are often required to perform additional steps to prepare and finish baking the final product.

In one example, sufficient quantities of dough may be shipped frozen from a baker to a restaurant. Prior to shipping, the frozen dough may be portioned into desired sizes. After the dough is thawed at the restaurant, the dough is generally proofed. Proofing dough (i.e., a dough-rise step) can present problems at restaurants with constrained space, limited equipment (e.g., no cabinet retarders), and inexperienced staff. If a batch of dough is not proofed properly, then the entire batch of the dough is ruined. Further, a batch of dough during proofing takes up space and carries the risk that that the dough (or a cart on which the dough is supported) could be knocked over or bumped, thereby ruining the entire batch of the dough.

SUMMARY

Examples of bread products and examples of methods of manufacturing the artisan bread product that eliminates or reduces the need to proof dough after it is thawed in a retarder is discussed. In one example method, the method comprises mixing ingredients to create a dough for making artisan bread, bulk fermenting the dough to create a non-uniform cell structure within the dough and to eliminate or reduce proofing of the dough after receipt by a restaurant, sheeting the dough by a sheeter after the dough has fermented, the sheeter being adjusted to allow a sufficient amount of the dough to be sheeted while substantially maintaining the non-uniform cell structure developed during the bulk fermenting, portioning the sheeted dough into portions of dough according to desired sizes while substantially maintaining the non-uniform cell structure developed during the bulk fermenting, freezing the portions of dough to create frozen portions of dough, and packaging and shipping the frozen portions of dough while substantially maintaining the non-uniform cell structure developed during the bulk fermenting, the bulk fermenting of the dough prior to the sheeting thereby enabling, at least in part, a restaurant to receive the frozen portions of dough, to retard the frozen portions of dough to create thawed portions of dough, and to bake the thawed portions of dough after retarding without proofing.

In various embodiments, the dough comprises flour as well as salt in a range of 1-2 flour weight (wt) %, baker's yeast in a range of 7-14 wt %, sweeteners in a range of 2-4 wt %, oil in a range of 2-4 wt %, vital wheat gluten in a range of 0-3 wt %, and/or dough conditioner in a range of 1-2 wt %. The dough may be free of chemical leavening. Bulk fermenting of the dough prior to the sheeting thereby enabling, at least in part, the restaurant to receive the frozen portions of dough, to retard the frozen portions of dough to create thawed portions of dough, and to bake the thawed portions of dough after retarding without proofing comprises the bulk fermenting of the dough prior to sheeting enabling, at least in part, the restaurant to receive the frozen portions of dough, to retard the frozen portions of the dough to create thawed portions of dough, to allow the thawed portions of dough from the retarder to come to an internal temperature in a range of 55-60° F. and to bake the thawed portions of dough without a proofing step.

During mixing the dough may be kept at a temperature in a range of 60° F. and 68° F. Bulk fermenting may comprise allowing the dough to rest for at least 45 minutes. Bulk fermenting may comprise maintaining temperature of the dough in a range of 62° F. and 66° F.

In various embodiments, sheeting comprises feeding the dough into a hopper, extruding the dough from the hopper to a roller, and rolling the dough to a desired thickness using the roller, the thickness of the dough being determined at least in part by a height of the roller, wherein the feeding, the extruding, and height of the roller maintaining, at least partially, the non-uniform cell structure developed during the bulk fermenting. The desired thickness may be in a range of 1.5-3 inches.

The freezing the portions of dough is performed during a time period in a range of 30 to 60 minutes. Each of the portions of dough may have a mass in a range of 130-150 grams. The frozen portions of dough may be manufactured, at least in part, in mass and at least the sheeting and the portioning are implemented through an assembly line.

In some embodiments, the method further comprises receiving, by the restaurant, the frozen portions of dough, retarding, by the restaurant, the frozen portions of dough in a retarder to create thawed portions of dough while substantially maintaining the non-uniform cell structure developed during the bulk fermenting, raising temperature, by the restaurant, of the thawed portions of dough without conventional proofing; and baking, by the restaurant, the thawed portions of dough after raising the temperature of the thawed portions of dough without conventional proofing after receiving the frozen portions of dough to create the artisan bread. The temperature of the thawed portions of dough may be raised by the restaurant to a range of 54° F. to 60° F.

An example dough comprising flour as well as salt in a range of 1-2 flour weight (wt) %, baker's yeast in a range of 7-14 wt %, sweeteners in a range of 2-4 wt %, oil in a range of 2-4 wt %, vital wheat gluten in a range of 0-3 wt %, and/or dough conditioner in a range of 1-2 wt %, wherein the dough is bulk fermented after mixing but before sheeting, thereby enabling the dough to not be subjected to a conventional proofing step between thawing and baking to make bread. The bread may be between 1.5 inches and 3 inches thick and comprises a non-uniform cell structure initially developed during the bulk fermentation. The baker's yeast may be cream yeast.

In some embodiments, the dough is portioned and each of the portions of dough has a mass in a range of 130-150 grams after freezing. The dough may have a thickness after sheeting is in a range of 1.5-3 inches.

These and other advantages will become apparent t upon a reading of the following descriptions and a study of the several examples shown in the drawings. The drawings are included for illustrative purposes and are not intended to limit possible or potential shapes, patterns, or locations of protrusions and/or indentations.

DETAILED DESCRIPTION

Figure 1:
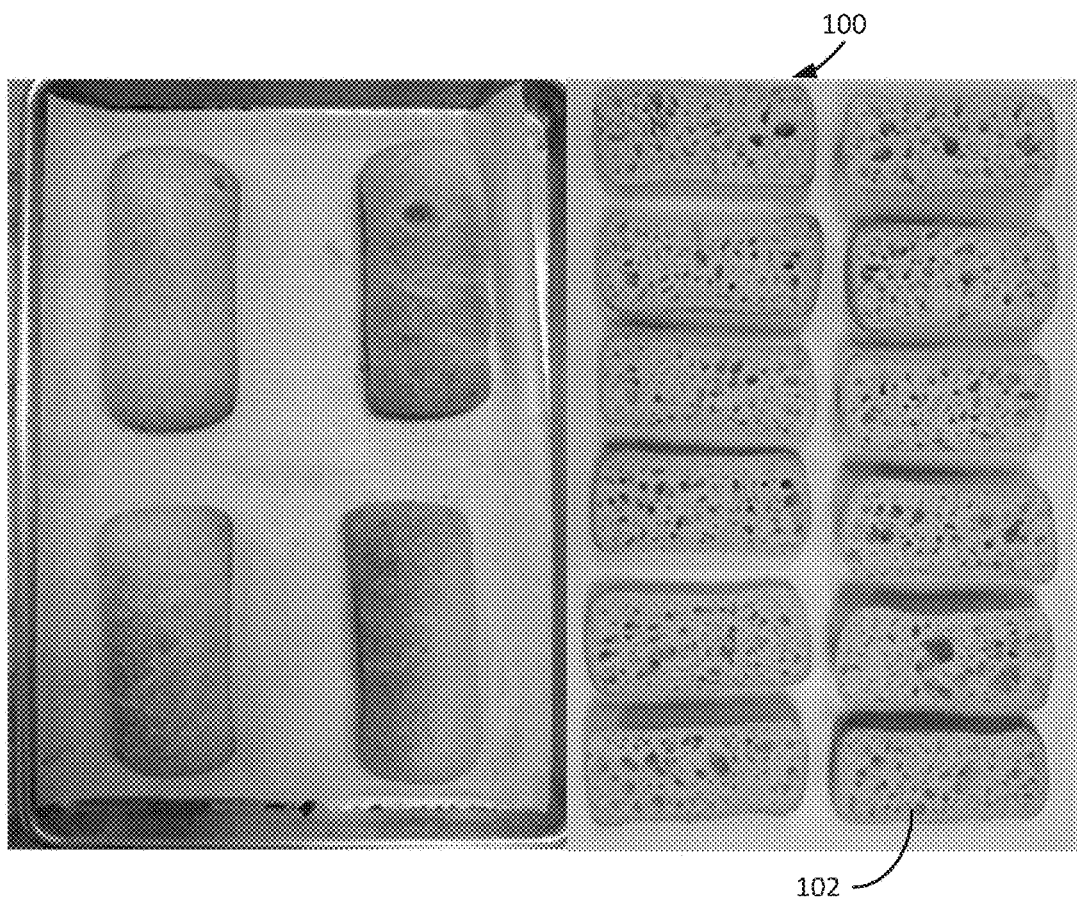
FIG. 1 depicts exterior and interiors of finished bread products manufactured according to the methods described in this paper.

Recent trends have shown that customers are increasingly enjoying a variety of different breads. For example, there is a general increase of interest for artisan style breads. Sandwich restaurant customers are differentiating their interests and are trying new types of bread. Customers are increasingly interested in "artisan style" breads including rustic breads and/or breads with a non-uniform cell structure. It will be appreciated that there may be variations in breads.

Of the artisan varieties of breads, ciabatta bread is seen as an emerging product with a significant increase of orders for breakfast and lunch. Ciabatta bread is increasingly popular. An example of ciabatta bread includes a long stretched flattened bread with a non-uniform cell structure with large holes, thin and crispy crust, moist crumb, and a sourdough flavor. Sandwich restaurants that carry or have carried artisan breads (like ciabatta) include MCDONALD'S in Canada, JACK IN THE BOX, CARIBOUT COFFEE, and ARBYS.

Unfortunately, many types of breads, including at least some artisan varieties, require proofing at the restaurant. For example, sufficient quantities of frozen bread are delivered to a restaurant for their consumer needs. The frozen bread is thawed overnight for the next day's use, often in a retarder, and then proofed (e.g., in a proof box or floored) for one to two hours before baking. Many restaurants, however, have limited space which if further limited during proofing large quantities of bread. Further, many restaurants have limited equipment and inexperienced staff. Mistakes during proofing (e.g., accidents or insufficient proofing time) may result. Further, restaurants are required to schedule and plan for proofing in order for bread to be available to their consumers.

Discussed herein is a method for retarder-to-oven bread product(s) wherein a proofing step is not required by the restaurant (e.g., by the retail store). As a result, any number of restaurants receiving bread from mass or commercial distribution is not required to schedule hours of proofing time, not required to give up scarce space at the restaurant for proofing, not required to obtain steam ovens or proofing drawers, and not required to train staff. For example, a chain of restaurants may no longer have to train staff to: schedule proofing to prepare bread for their consumers, operate equipment, maintain equipment, purchase equipment, walk around space needed for proofing, know when to put the dough after proofing into an oven, or maintain temperatures and/or humidity for proofing.

The quality of the retarder-to-oven bread may not suffer in terms of flavor or texture. Further, the retarder-to-oven bread may be one of many styles of bread that are currently experiencing increasing demand by consumers. Recently, 57% of consumers are interested in trying new types of bread. Ciabatta breach continues to penetrate menus, year over year. The ciabatta bread may be infused with rich olive oil for a full-bodied flavor. The texture may be reasonably firm with a crisp crust when toasted. In one example, the ciabatta bread may include malt flour, extra version olive oil, and sea salt.

In 2012, sandwich preferences for ciabatta were up 18% in the US and up 7% in 2014. In fact, in some studies, 31% of consumers recently reported that they enjoy specialty breads. Premium and nontraditional breads like ciabatta, focaccia, pretzel bread, and waffle are appearing on menus. Further, some studies suggest that 43% of consumers would pay more for sandwiches that feature premium or higher-quality ingredients. Many of these breads may be mass produced and distributed using methods described herein wherein the breads are not required to be proofed by the restaurant (e.g., after receiving the dough during mass distribution, the restaurants are not required to proof the dough after thawing).

In one example, ciabatta bread (that may be sold at SUBWAY) includes a dimension size of 6×3 inches, a weight of 5.5 ounces, and the recipe may include bread flour, water, yeast, sugar, soybean oil, wheat gluten, dough conditioner (optional), and salt discussed herein. Another example of ciabatta bread is olive oil infused ciabatta bread.

FIG. 1 depicts exterior and interiors of finished bread products 100 manufactured according to the methods described herein. The finished bread products 100 are artisan in that the exterior is a hard crust while the interior is soft and includes an irregular, non-uniform cell structure with open cells 102. The bread products 100 may be any type of bread (e.g. ciabatta, potato rustic, sprouted wheat, and Dakota). In various embodiments, the bread products may include flavor or textural additives (e.g. seeds, rosemary, and olive oil). The bread products 100 may be of a size to allow for shipping of the bread products 100 and for use in creating sandwiches. For example, the bread products 100 may have a length of 6 inches, a width of 3 inches, and a height of 3 inches. In another example, the finished bread products may have a mass between 130 grams and 150 grams.

Many different breads may be baked using the retard to oven method described herein. Such breads include, but are not limited to, ciabatta, potato rosemary rustic, sprouted wheat, seeded Dakota, and hash brown potato. Ciabatta bread continues to penetrate menus, year over year. Infused flavors are on-trend as well. Flavor infusions for ciabatta bread may include olive oil for a fuller-bodied flavor. In some embodiments described herein, ciabatta is a long stretched flatten bread with a non-uniform cell structure with large holes. The ciabatta crust may be thin and crispy with a sourdough flavor and a moist crumb.

Ingredients for at least one embodiment of the ciabatta may include: enriched flour (e.g., wheat flour, niacin, reduced iron, thiamine, mononitrate, riboflavin, folic acid), water, yeast, 2% or less of the following: sugar, extra virgin olive oil, wheat gluten, dried extract of barley and corn, dough conditioner (inactive yeast, malted barley flour, ascorbic acid, enzymes), cellulose gum, dextrose, soybean oil, and sea salt.

Ingredients by weight for ciabatta may be as follows:

| Ingredients | Flour % |
| --- | --- |
| Enriched Bread Flour | 100.00 |
| Water | 64-74 |
| Salt | 1-2 |
| Cream Yeast | 7-14 |
| Sugar | 2-4 |
| Oil | 2-4 |
| Vital Wheat Gluten | 0-3 |
| Dough Conditioner | 1-2 |
| Flavor | 1-2 |

In one example, ciabatta may comprise flour as well as (in flour weight) salt in a range of 1-2 wt %, baker's yeast in a range of 7-14 wt %, sweeteners (e.g., sugar) in a range of 2-4 wt %, oil in a range of 2-4 wt %, vital wheat gluten in a range of 0-3 wt %, and dough conditioner in a range of 1-2 wt % the ciabatta may include flavorings as well in a range of 1-2 wt %. All or part of the salt may include sea salt. Further, all or part of the oil may include extra virgin olive oil and/or soybean oil. All or part of the flour may be enriched flour, wheat flour, and/or malt flour. In some embodiments, sea salt, extra virgin olive oil, and/or dried extract of barley and corn may be all or a part of the flavoring (e.g., rather than accounting for or being a part of other ingredients listed above flavor in the chart above). Similarly, malt flour may be a part of flavoring.

The frozen size of the ciabatta may be approximately 6"×3" and be a weight of approximately 135 grams.

Although sugar is provided as an example of sweeteners, it will be appreciated that any sweetener (including artificial sweeteners and/or natural sweeteners) may be used for any of the breads described herein. Further, the sweetener may come from any source (e.g., cane sugar).

Similarly baker's yeast for any of the breads discussed herein may be any kind of yeast including, for example, cream yeast, compressed yeast, or the like. It will be appreciated that the percent by flour weight may change for the baker's yeast depending on the type of yeast used (e.g., concentrated yeast may have less liquid than cream yeast thereby changing the weight).

Potato rosemary rustic bread may also be baked using the retarder to oven method discussed herein. The potato rosemary rustic bread may be a ciabatta with rosemary. This potato rosemary rustic bread may be prepared with rosemary, sea salt, and/or olive oil. Further, the potato rosemary rustic bread may include the non-regular, open cell structure discussed herein.

Ingredients for at least one embodiment of the potato rosemary rustic bread may include: enriched flour (e.g., wheat flour, niacin, reduced iron, thiamine, mononitrate, riboflavin, folic acid), water, potato flour, yeast, 2% or less of the following: sugar, extra virgin olive oil, dough conditioner (inactive yeast, malted barley flour, ascorbic acid, enzymes), cellulose gum, dextrose, wheat gluten, sea salt, and dried rosemary.

Ingredients by weight may be similar to ciabatta as follows:

| Ingredients | Flour % |
| --- | --- |
| Enriched Bread Flour | 100.00 |
| Water | 64-74 |
| Salt | 1-2 |
| Cream Yeast | 7-14 |
| Sugar | 2-4 |
| Oil | 2-4 |
| Vital Wheat Gluten | 0-3 |
| Dough Conditioner | 1-2 |
| Flavor | 1-2 |

In one example, potato rosemary rustic bread may comprise flour as well as (in flour weight) salt in a range of 1-2 wt %, baker's yeast in a range of 7-14 wt %, sweeteners (e.g., sugar) in a range of 2-4 wt %, oil in a range of 2-4 wt %, vital wheat gluten in a range of 0-3 wt %, and dough conditioner in a range of 1-2 wt % the ciabatta may include flavorings as well in a range of 1-2 wt %. All or part of the salt may include sea salt. Further, all or part of the oil may include extra virgin olive oil and all or part of the flour may be enriched bread flour, wheat flour, and/or potato flour. In some embodiments, the sea salt, extra virgin olive oil, and/or rosemary may be all or a part of the flavoring (e.g., rather than accounting for or being a part of other ingredients listed above flavor in the chart above). Similarly, potato flour may be a part of flavoring.

The frozen size of the potato rosemary rustic bread may be approximately 6"×3" and be a weight of approximately 135 grams.

Sprouted wheat bread is also increasingly popular. Sprouted wheat "mentions" have continued to grow over the past seven years and are projected to heighten. Sprouted wheat bread may be baked using the retarder to oven method discussed herein. The sprouted wheat bread may be prepared with sprouted wheat flour, extra virgin olive oil, and/or sea salt. Further, the sprouted wheat bread may include the non-regular, open cell structure discussed herein.

Ingredients for at least one embodiment of the sprouted wheat bread may include: enriched flour (e.g., wheat flour, niacin, reduced iron, thiamine, mononitrate, riboflavin, folic acid), water, sprouted wheat flour, yeast, 2% or less of the following: sugar, extra virgin olive oil, wheat gluten, dough conditioner (inactive yeast, malted barley flour, ascorbic acid, enzymes), cellulose gum, dextrose, soybean oil, and sea salt.

Ingredients by weight may be similar to ciabatta as follows:

| Ingredients | Flour % |
| --- | --- |
| Enriched Bread Flour | 100.00 |
| Water | 64-74 |
| Salt | 1-2 |
| Cream Yeast | 7-14 |
| Sugar | 2-4 |
| Oil | 2-4 |
| Vital Wheat Gluten | 0-3 |
| Dough Conditioner | 1-2 |
| Flavor | 1-2 |

In one example, sprouted wheat bread may comprise flour as well as (in flour weight) salt in a range of 1-2 wt %, baker's yeast in a range of 7-14 wt %, sweeteners (e.g., sugar) in a range of 2-4 wt %, oil in a range of 2-4 wt %, vital wheat gluten in a range of 0-3 wt %, and dough conditioner in a range of 1-2 wt % the ciabatta may include flavorings as well in a range of 1-2 wt %. All or part of the salt may include sea salt. Further, all or part of the oil may include olive oil and/or soybean oil. All or part of the flour may be enriched bread flour, wheat flour, and/or sprouted wheat flour. In some embodiments, the sea salt, sprouted wheat flour, and/or extra virgin olive oil may be all or a part of the flavoring (e.g., rather than accounting for or being a part of other ingredients listed above flavor in the chart above). Similarly, sprouted wheat flour may be a part of flavoring.

The frozen size of the sprouted wheat bread may be approximately 6"×3" and be a weight of approximately 135 grams.

Seeded Dakota bread matches customer-driven trends for ancient grains and seeds. Seeded Dakota bread may be baked using the retarder to oven method discussed herein. The seeded Dakota bread may be prepared with millet, pumpkin, poppy, and sunflower seeds, honey, molasses, and/or sea salt. Further, the seeded Dakota bread may include the non-regular, open cell structure discussed herein.

Ingredients for at least one embodiment of the seeded Dakota may include: enriched flour (e.g., wheat flour, niacin, reduced iron, thiamine, mononitrate, riboflavin, folic acid), water, millet, whole wheat flour, honey, yeast, 2% or less of the following: pumpkin seeds, poppyseeds, sunflower seeds, molasses, soybean oil, dough conditioner (inactive yeast, malted barley flour, ascorbic acid, enzymes), cellulose gum, dextrose, wheat gluten, and sea salt.

Ingredients by weight may be similar to ciabatta as follows:

| Ingredients | Flour % |
| --- | --- |
| Enriched Bread Flour | 100.00 |
| Water | 64-74 |
| Salt | 1-2 |
| Cream Yeast | 7-14 |
| Sugar | 2-4 |
| Oil | 2-4 |
| Vital Wheat Gluten | 0-3 |
| Dough Conditioner | 1-2 |
| Flavor | 1-2 |

In one example, seeded Dakota bread may comprise flour as well as (in flour weight) salt in a range of 1-2 wt %, baker's yeast in a range of 7-14 wt %, sweeteners (e.g., sugar) in a range of 2-4 wt %, oil in a range of 2-4 wt %, vital wheat gluten in a range of 0-3 wt %, and dough conditioner in a range of 1-2 wt % the ciabatta may include flavorings as well in a range of 1-2 wt %. All or part of the salt may include sea salt. Further, all or part of the flour may be enriched bread flour, wheat flour, whole wheat flour, and/or millet. All or part of the sweetener (e.g., sugar) may include honey and/or molasses. All or part of the oil may be soybean oil. In some embodiments, the sea salt, pumpkin seeds, poppyseeds, sunflower seeds, honey, and/or molasses may be all or a part of the flavoring (e.g., rather than accounting for or being a part of other ingredients listed above flavor in the chart above). Similarly, millet may be a part of flavoring.

The frozen size of the seeded Dakota may be approximately 6"×3" and be a weight of approximately 135 grams.

Hash brown potato bread may be similar to ciabatta with a potato favor. Hash brown potato bread may be baked using the retarder to oven method discussed herein. The hash brown potato bread may be prepared with potato flour, malt, natural flavors (e.g., butter, "skillet", potato), and/or sea salt. Further, the hash brown potato bread may include the non-regular, open cell structure discussed herein.

Ingredients for at least one embodiment of the hash brown potato bread may include: enriched flour (e.g., wheat flour, niacin, reduced iron, thiamine, mononitrate, riboflavin, folic acid), water, potato flour, yeast, 2% or less of the following: sugar, soybean oil, malt powder, dough conditioner (inactive yeast, malted barley flour, ascorbic acid, enzymes), cellulose gum, dextrose, sea salt, sunflower oil, maltodextrin, olive oil, natural flavors.

Ingredients by weight may be similar to ciabatta as follows:

| Ingredients | Flour % |
| --- | --- |
| Enriched Bread Flour | 100.00 |
| Water | 64-74 |
| Salt | 1-2 |
| Cream Yeast | 7-14 |
| Sugar | 2-4 |
| Oil | 2-4 |
| Vital Wheat Gluten | 0-3 |
| Dough Conditioner | 1-2 |
| Flavor | 1-2 |

In one example, hash brown potato bread may comprise flour as well as (in flour weight) salt in a range of 1-2 wt %, baker's yeast in a range of 7-14 wt %, sweeteners (e.g., sugar) in a range of 2-4 wt %, oil in a range of 2-4 wt %, vital wheat gluten in a range of 0-3 wt %, and dough conditioner in a range of 1-2 wt % the ciabatta may include flavorings as well in a range of 1-2 wt %. All or part of the salt may include sea salt. Further, all or part of the flour may be enriched bread flour, wheat flour, and/or potato flour. All or part of the oil may include sunflower oil, soybean oil, and/or olive oil. In some embodiments, potato flour, malt powder, butter flavorings, potato flavorings, sunflower oil, soybean oil, olive oil, and sea salt may be all or a part of the flavoring (e.g., rather than accounting for or being a part of other ingredients listed above flavor in the chart above). Similarly, millet may be a part of flavoring.

The frozen size of the hash brown potato bread may be approximately 3"×3" and be a weight of approximately 70 grams.

It will be appreciated that there may be other ingredients and formulas to make ciabatta and/or one of the other breads discussed herein. For example, ingredients by weight for ciabatta and/or one or more of the other breads discussed herein may be as follows:

| Ingredients | Flour % | Total % |
| --- | --- | --- |
| Enriched Bread Flour | 100.00% | 50.99% |
| Water | 67.52% | 34.43% |
| Salt | 1.16% | 0.59% |
| Cream Yeast | 12.31% | 6.28% |
| Sugar | 5.98% | 3.05% |
| Oil | 2.99% | 1.53% |
| Vital Wheat Gluten | 2.01% | 1.02% |
| Malt Flour | 2.01% | 1.02% |
| Dough Conditioner | 2.00% | 1.02% |
| Flavor Enhancer | 0.14% | 0.07% |

The sugar may be granulated sugar, the oil may be soybean oil, and the flavor enhance may be, for example a slat type 91465A for example.

In one example, ciabatta or one or more of the breads discussed may comprise flour as well as (in flour weight) salt in a range of 1-2 wt %, baker's yeast in a range of 7-14 wt %, sweeteners (e.g., sugar) in a range of 2-7 wt %, oil in a range of 2-4 wt %, vital wheat gluten in a range of 0-3 wt %, and dough conditioner in a range of 1-3 wt %. The bread may include flavorings as well in a range of 0.1-2 wt %. The bread may include water in a range of 64-74% wt, and malt flour in a range of 1.5-2.5% wt. All or part of the salt may include sea salt. Further, all or part of the oil may include extra virgin olive oil and/or soybean oil. All or part of the flour may be enriched flour, wheat flour, and/or malt flour. In some embodiments, sea salt, extra virgin olive oil, and/or dried extract of barley and corn may be all or a part of the flavoring (e.g., rather than accounting for or being a part of other ingredients listed above flavor in the chart above). Similarly, malt flour may be a part of flavoring.

The finished bread products 100 may be manufactured in mass. In various embodiments, the finished bread products 100 may be manufactured, at least in part, through an assembly line or semi-automated steps. For example, the finished bread products 100 may be manufactured, in part, through a conveyor belt and a cutting machine for portioning the bread products and subsequent baking to create the finished bread products 100.

In various embodiments, the dough may be substantially free of chemical leavening (e.g., baking powder or the like). Substantially free of chemical leavening may indicate that the dough does not have sufficient acid and base in amounts that will cause significant leavening. As a result, the dough may not rise or provide lift caused be chemical action of chemical leavening during baking. Further, the method described herein does not require the restaurant (e.g., retail store) to have or maintain steam in the oven for baking. In some embodiments, the method described in FIG. 2 herein is used to create frozen portions of dough that may be ultimate go from retarder to oven (e.g., not a steam oven) without a conventional proofing step after freezing. Conventional proofing may refer to a process whereby dough is allowed to sit at temperatures between 90° F. and 100° F. at a relative humidity of 80% to 90% for a time from 30 minutes to two hours.

Figure 2:
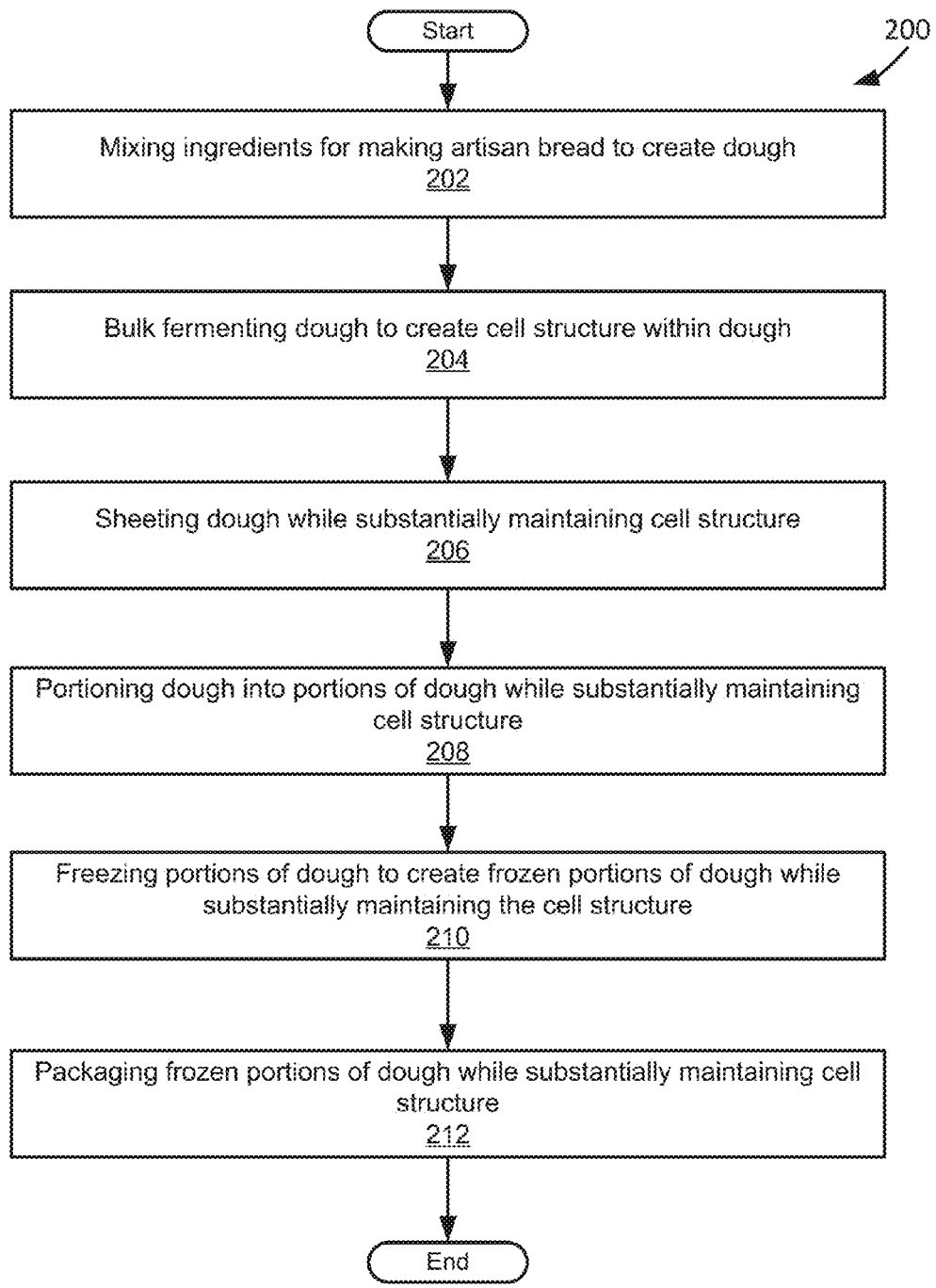
FIG. 2 depicts a flowchart of an example of a method for manufacturing an artisan bread product that eliminates or reduces the need to proof dough after it has been thawed in a retarder.

FIG. 2 depicts a flowchart 200 of an example of a method for manufacturing a bread product that eliminates or reduces the need to proof dough after it has been thawed. It will be appreciated that mass manufacturing and distribution of dough products to deliver breads to many consumer retail stores requires significant operations that can efficiently scale depending upon amount of demand and scheduling to deliver fresh products. Similarly, removing a conventional proofing step after thawing but providing an improved product relieves space, equipment, and training constraints to any number of restaurants (and any number of restaurant chains).

At least one of the steps in the flowchart 200 may be implemented as part of a bulk manufacturing process and/or an assembly line to allow for the production of the artisan bread products in mass. Prior to step 202, ingredients may be obtained and scaled depending on delivery needs for mass distribution (e.g., distribution to two or more retail facilities for providing food to consumers). In step 202, during a mixing step, ingredients for making bread products are mixed to form a dough. An example of ingredients that may be mixed to create a dough for an artisan bread product include enriched bread flour, water, salt, cream yeast, sugar, oil, wheat gluten, dough conditioner, and additional flavors. The ingredients may be introduced in a container as part of an industrial batch mixer and subsequently mixed to form a dough for mass production of bread products. The ingredients may be mixed during the mixing step at a suitable temperature for ensuring the yeast survives. For example, the ingredients and resulting dough may be kept at a temperature between 60° F. and 68° F. during the mixing step.

In step 204, during a bulk fermentation step, the dough created at step 202 is bulk fermented to create a cell structure and flavor (e.g., sourdough flavor) within the dough. Bulk fermentation may also, for example, assist in the creation of gluten. The fermentation step is bulk in that the mass of dough is allowed to ferment before it is portioned into individual portions. In various embodiments, the dough can be left in the container in which it was mixed to ferment or transfer to a new receptacle for fermentation.

During the bulk fermentation step yeast within the dough convert carbohydrates into carbon dioxide. Carbon dioxide created during the bulk fermentation step causes the dough to expand and creates air pockets within the dough, thereby forming a cell structure within the dough. The cell structure may be irregular, open, and non-uniform throughout the dough. The bulk fermentation step may be of a sufficient time to allow the dough to ferment a desired amount and be performed at a sufficient temperature to ensure that the yeast is capable of converting carbohydrates to carbon dioxide. For example, the bulk fermentation step may be for a time period in a range of 45 minutes to an hour. The dough may be kept at a temperature above 60° F. (e.g., in a range of 60° F.-68° F.) during the bulk fermentation step. The dough may be, in some embodiments, kept at a temperature above 68° F. during bulk fermentation depending on the manufacturing line and speed of the process.

It will be appreciated that other time periods may be utilized for bulk fermentation. For example, the bulk fermentation step may be for a time period in a range of thirty minutes to three hours depending upon the ingredients of the bread, humidity, and/or temperature of the facility (e.g., the room) where the bulk fermentation is occurring.

In step 206, during a sheeting step, the dough is sheeted while substantially maintaining the cell structure of the dough. The sheeting step may be performed at low stress to prevent the dough from degassing and also shapes the dough to a desired thickness. In some embodiments, the sheeting step includes feeding the dough into a hopper, extruding the dough from the hopper to a roller, and rolling out the dough to the desired thickness. The roller may comprise, in one example, to rollers with spacing adjusted for the desired thickness and to avoid or reduce damaging (or crushing) cell structure. In various embodiments, the desired thickness may be in a range of 1.5 inches to 3 inches. Stress may be reduced during sheeting by adjusting the roller to roll the dough out to the desired thickness. For example the roller may be adjusted in order to decrease the thickness of the bread products and avoid significantly damaging the cell structure developed during bulk fermentation. Further, stress may be reduced by slowing the speed of sheeting.

It will be appreciated that the desired thickness may be in any range.

It will be appreciated that feeding the dough into the hopper, extruding the dough, and rolling out the dough may each be performed with care to avoid damaging the cell structure developed during bulk fermentation and to improve the quality of the bread product when provided to the consumer by the restaurant without requiring an additional proofing step (e.g., at the restaurant). In some embodiments, feeding the dough into the hopper, extruding the dough, and rolling out the dough are each performed in order to maintain or substantially maintain the cell structure. Each step may be performed slowly, for example, to avoid degassing or reduce degassing of the dough.

In step 208, during a portioning step, the dough is divided into portions of dough according to a desired size while substantially maintaining the cell structure created as a result of the bulk fermentation. The portioning step may include, for example, cutting the dough to desired sizes while substantially maintaining the cell structure. In some embodiments, portioning may be performed slowly and/or cutting edges maintained to avoid or reduce damaging the cell structure. The dough may be cut using an automated cutting mechanism as part of an assembly line. For example, the dough may be cut using ultrasonic knives to prevent the dough from sticking to the cutting mechanism.

An example of a desired size includes a length in a range of 3-6 inches, width in a range of 3-6 inches, and a mass in a range of 130 grams to 150 grams. It will be appreciated that there may be any number of desired sizes.

In step 210, during a freezing step, the portions of dough are frozen while substantially maintaining the cell structure. The portions of dough may be frozen (e.g., in a blast chiller) to achieve a desired internal temperature while substantially maintaining the cell structure. An example desired internal temperature may be in a range between −15° F. and 15° F. In another example, the desired internal temperature may be in a range between −5° F. and 5° F. or in a range of −15° F. and 5° F. It will be appreciated that other ranges may be utilized.

In step 212, during a packaging step, the frozen portions of dough are packaged while substantially maintaining the cell structure. The frozen portions of dough may be packaged according to mechanisms allowing for shipping of the frozen portions of dough to restaurants or consumers while substantially maintaining the cell structure throughout shipping. In various embodiments, the frozen portions of dough may be packaged individually or in batches. Any amount of frozen portions of dough may be divided to be shipped to any number of restaurants (e.g., retail stores for delivering bread to consumers).

Once received, restaurants or consumers may thaw the frozen portions of dough in a retarder and bake the thawed portions of dough without the need to proof the dough between thawing and baking.

It will be appreciated that there may be any number of steps in many different orderings. For example, there may be additional steps for forming, cutting, processing, and/or resting dough. For each additional step that occurs after bulk fermentation, the step may occur such that cell structure during bulk fermenting is maintained (e.g., forming, cutting, and processing is delicate and/or slow to prevent degassing or collapse of cell structure).

Figure 3:
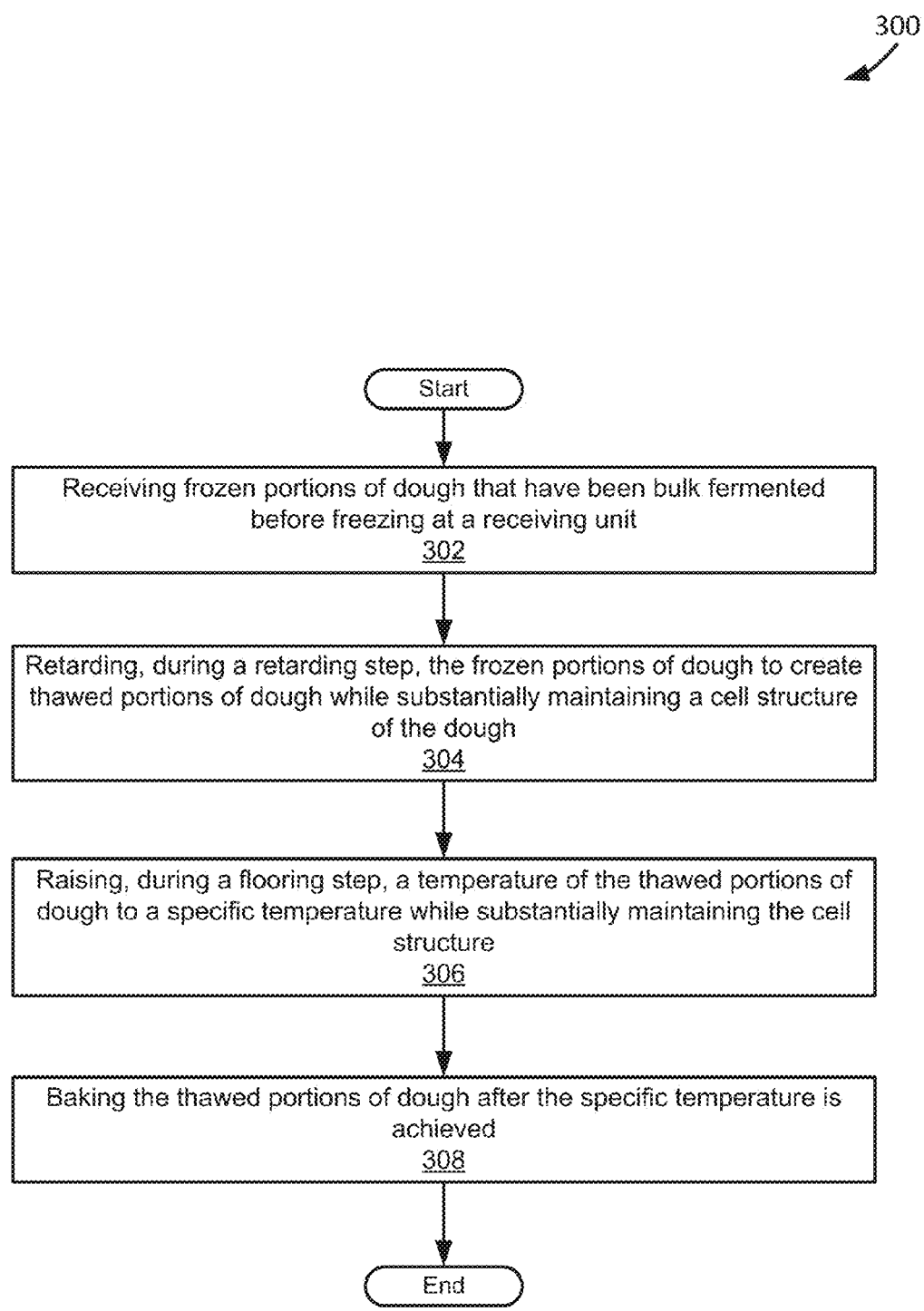
FIG. 3 depicts a flowchart of an example of a method for baking artisan bread products without the need to proof dough after it has been thawed in a retarder.

FIG. 3 depicts a flowchart 300 of an example of a method for baking bread products without the need to proof dough after it has been thawed in a retarder. The flowchart 300 begins at step 302, where frozen portions of dough created in a process similar that described in flowchart 200 (e.g., where the bulk fermentation occurs after mixing but before sheeting) are received at a receiving unit. A receiving unit may include a restaurant or a consumer to bake the frozen portions of dough. In various embodiments, the frozen portions of dough do not need to be portioned again after being received.

In step 304, during a retarding step, the frozen portions of dough are thawed while to create thawed portions of dough. In various embodiments, the frozen portions of dough may be positioned on a baking sheet which is then placed into a retarder (e.g., a cabinet retarder). The frozen portions of dough may be placed in the retarder for a suitable amount of time (e.g., overnight, in a range of 8 to 12 hours), at least long enough to allow the dough to thaw. The retarder may, in some examples, maintain temperatures between 33° F. and 42° F. and some retarders may maintain temperatures in the range of between 65° F. and 85° F.

In step 306, during a flooring step, a temperature of the thawed portions of dough is allowed to reach a specific temperature. In one example, the thawed portions of dough are removed from a retarder and put in racks (e.g., in a process that may be termed as "flooring"). In one example, the specific temperature may be in a range of 55.degree. F. to 60.degree. F. In various embodiments, baking sheets holding the thawed dough may be removed from the retarder such that the temperature of the thawed portions of dough reaches the specific temperature.

In step 308, the thawed portions of dough are baked after the specific temperature is achieved. The thawed portions of dough may be baked without having to proof the dough. Proofing may not be necessary because of the bulk fermentation after mixing and before sheeting and freezing the dough. In some embodiments, the dough may be sprayed or layered with vegetable oil before baking. In various embodiments the thawed portions of dough may be baked in an oven preheated to 350° F.

It will be appreciated that there may be any number of steps in many different orderings. For example, there may be additional steps after freezing for forming, cutting, processing, and/or resting dough. For each additional step that occurs after bulk fermentation, the step may occur such that cell structure during bulk fermenting is maintained (e.g., forming, cutting, and processing is delicate and/or slow to prevent degassing or collapse of cell structure).

The present invention(s) are described above with reference to exemplary embodiments. It will be appreciated that various modifications may be made and other embodiments can be used without departing from the broader scope of the present invention(s). Therefore, these and other variations upon the exemplary embodiments are intended to be covered by the present invention.

I claim:

1. A method comprising:
   mixing ingredients to create a dough for making artisan bread at a desired thickness, the artisan bread to include a hard-crust exterior and a soft interior with a non-uniform cell structure, the ingredients including yeast and in a range of 7-14 wt % not including a chemical leavening agent;
   bulk fermenting the dough within a temperature range to allow the yeast to rise and create the non-uniform cell structure within the dough;
   sheeting the dough by a sheeter after the bulk fermenting the dough, the sheeter being adjusted to sheet the dough to substantially the desired thickness and without degassing the dough to substantially maintain the non-uniform cell structure developed during the bulk fermenting;
   using one or more ultrasonic knives to portion the sheeted dough into portions of dough, the ultrasonic knives portioning the sheeted dough without degassing the dough to substantially maintain the non-uniform cell structure developed during the bulk fermenting;
   using a blast chiller to freeze the portions of dough to create frozen portions of dough, the blast chiller freezing the portions of dough without degassing the dough to substantially maintain the non-uniform cell structure developed during the bulk fermenting;
   packaging the frozen portions of dough without degassing the dough to substantially maintain the non-uniform cell structure developed during the bulk fermenting, thereby assembling packaged frozen portions of dough that a restaurant can receive, retard the frozen portions of dough in a retarder within a temperature range to create thawed portions of dough without proofing the thawed portions of dough to avoid causing the yeast to additionally rise and in order to substantially maintain the non-uniform cell structure developed during the bulk fermenting, and immediately bake the thawed portions of dough after retarding without proofing the thawed portions of dough before baking because the thawed portions of dough substantially maintain the non-uniform cell structure developed during the bulk fermenting; and shipping the packaged frozen portions of dough to the restaurant.

2. The method of claim 1 wherein the ingredients comprise flour and salt in a range of 1-2 flour weight (wt) %, baker's yeast in a range of 7-14 wt %, sweeteners in a range of 2-4 wt %, oil in a range of 2-4 wt %, vital wheat gluten in a range of 0-3 wt %, and dough conditioner in a range of 1-2 wt %.

3. The method of claim 1 wherein the retarder is configured to thaw the frozen portions of dough to reach an internal temperature in a range of 55–60° F.

4. The method of claim 1 wherein during the mixing, the dough is maintained at a temperature in a range of 60–68° F.

5. The method of claim 1 wherein the bulk fermenting comprises allowing the dough to rest for at least 45 minutes.

6. The method of claim 1 wherein the bulk fermenting the dough within a temperature range comprises bulk fermenting the dough within a temperature range of 62-66° F.

7. The method of claim 1 wherein the sheeting comprises:
feeding the dough into a hopper;
extruding the dough from the hopper to a roller, the roller being positioned at a height substantially equivalent to the desired thickness; and
rolling the dough using the roller,
wherein the feeding, the extruding, and the height of the roller maintain, at least partially, the non-uniform cell structure developed during the bulk fermenting.

8. The method of claim 1 wherein the using the blast chiller to freeze the portions of dough is performed during a time period in a range of 30-60 minutes.

9. The method of claim 1 wherein each of the portions of dough has a mass in a range of 130-150 grams.

10. The method of claim 7 wherein the desired thickness is in a range of 1.5-3 inches.

11. The method of claim 1 wherein the frozen portions of dough are manufactured, at least in part, in mass and at least the sheeting and the portioning are implemented through an assembly line.

12. The method of claim 1 further comprising:
receiving, by the restaurant, the packaged frozen portions of dough;
retarding, by the restaurant, the frozen portions of dough in a retarder to create thawed portions of dough without proofing the thawed portions of dough to avoid causing the yeast to additionally rise and in order to substantially maintain the non-uniform cell structure developed during the bulk fermenting;
raising, by the restaurant, a temperature of the thawed portions of dough without conventional proofing; and
baking, by the restaurant, the thawed portions of dough to create the artisan bread.

13. The method of claim 12 wherein the temperature of the thawed portions of dough is raised by the restaurant to a range of 54-60° F.

* * * * *